United States Patent [19]

Ishikawa

[11] Patent Number: 5,343,355
[45] Date of Patent: Aug. 30, 1994

[54] SAFETY SHUTTER DEVICE FOR DRAWOUT TYPE SWITCH GEAR

[75] Inventor: Takayoshi Ishikawa, Fukuyama, Japan

[73] Assignee: Mitsubishi Denki Kabushiki Kaisha, Tokyo, Japan

[21] Appl. No.: 80,770

[22] Filed: Jun. 24, 1993

[30] Foreign Application Priority Data

Jun. 30, 1992 [JP] Japan .................. 4-172343

[51] Int. Cl.⁵ .............................................. H02B 1/14
[52] U.S. Cl. .................. 361/617; 200/50 AA; 200/304
[58] Field of Search .............. 200/50 A, 50 AA, 304, 200/305; 439/131; 361/605, 607, 609, 615, 617, 610, 725, 727

[56] References Cited

U.S. PATENT DOCUMENTS 4,285,026 8/1981 Clausing ............................ 361/345
4,926,286 5/1990 Maki .................................. 361/345

FOREIGN PATENT DOCUMENTS 59-6563 2/1984 Japan .
1-39281 8/1989 Japan .
0858157 8/1981 U.S.S.R. ............................. 361/617

Primary Examiner—Gerald P. Tolin
Attorney, Agent, or Firm—Burns, Doane, Swecker & Mathis

[57] ABSTRACT

The safety shutter device comprises, a fixed shutter blade (19) provided on the front face of the lead conductor carrying member (11), at least one shutter driving unit accommodated in an insertion space (18) which is between the lead conductor carrying members (11) or between one of the lead conductor carrying member and the side wall of a base frame (1) and secured there by the fixed shutter blades, and a pair of movable shutter blades (27) provided on the shutter driving units to be actuated by the pushed-in and drawn-out operation of the circuit breaker (2).

4 Claims, 12 Drawing Sheets

SAFETY SHUTTER DEVICE FOR DRAWOUT TYPE SWITCH GEAR

FIELD OF THE INVENTION AND RELATED ART STATEMENT

1. FIELD OF THE INVENTION

The present invention generally relates to a drawout type switch gear. More particularly, it is concerned with a safety shutter device for such a drawout type switch gear that has a base frame, a circuit breaker movably mounted on said base frame in a manner to be drawn out of or pushed into said base frame.

2. DESCRIPTION OF THE PRIOR ART

One of the prior art safety shutter device for the drawout type switch gear as shown in Japanese Utility Model Examined Publication (Jikko Sho) 61-14,256 is illustrated in FIGS. 16, 17 and 18 of the attached drawings. In those Figures, FIG. 16 is a schematic side view of the drawout type switch gear in its state wherein the circuit breaker is drawn out of the base frame, FIG. 17 is a schematic side view of the switch gear shown in FIG. 16, in such a state that the circuit breaker is on a way to be inserted into the base frame, with its shutter open, and FIG. 18 is a schematic side view of the switch gear shown in FIGS. 16 and 17, in the connected state of the circuit breaker.

In these Figures, the switch gear with the safety shutter device includes: a base frame 1, the circuit breaker 2 movably mounted on the base frame 1 so as to be drawn out of or pushed into the base frame 1, a pair of frame-side main circuit lead conductors 3 mounted on the base frame 1 through a terminal pedestal 4, a pair of breaker-side main circuit lead conductors 5 mounted on the circuit breaker 2, a fixed shutter blade 6 mounted on the base frame 1 and having a pair of openings 6a for the lead conductors, a movable shutter blade 7 also mounted on the base frame 1 while permitted of its limited vertical movement with respect to the fixed shutter blade 6 and having a pair of openings 7a for the lead conductors, an actuating pin 8 provided on the movable shutter blade 7, a shutter actuating plate 9 provided on the circuit breaker 2 whose slope 9a can engage with the actuating pin 8 to effect the limited vertical movement of the movable shutter blade 7, and a pair of contact fingers 10 mounted on the base frame 1 for connecting the both lead conductors 3 and 5.

In the following paragraphs, the operation of the above-mentioned prior art drawout type switch gear combined with the safety shutter device will be described.

When the circuit breaker 2 is in its drawn out position, the movable shutter blade 7 is in its lower position and closes the opening 6a of the fixed shutter blade 6 as shown by FIG. 16. When the circuit breaker 2 of the location indicated by FIG. 16 is pushed into the base frame 1, the movable shutter blade 7 is elevated by the actuating plate 9 to bring an open state of the fixed shutter blade 6 on the way of the circuit breaker 2 to be inserted into the base frame 1 shown by FIG. 17. Thus the breaker-side main circuit lead conductors 5 are connected to the contact fingers 10 through both the openings 7a and 6a as shown by FIG. 18.

In the above-mentioned safety shutter device, the shutter blades 6 and 7 must however be installed on the base frame in their parts level, namely, must be assembled on the basis of discrete parts and components, with the aid of tools; and hence there is a problem in that a great deal of time is consumed for the assembling, inspection and maintenance.

SUMMARY AND OBJECT OF THE INVENTION

The present invention has been made in order to solve the above-mentioned problem, and has, as its object, a provision of a safety shutter device for the drawout type switch gear that has a good workability in assembling, and permits an easy maintenance and inspection. The disclosed safety shutter device can be installed on the drawout type switch gear in a simple operation without using any tool.

According to the present invention, the drawout type switch gear comprises, a base frame, a circuit breaker which is movably mounted on the base frame in a manner to be drawn out of or pushed into the base frame when transferred between a drawout position and a pushed-in position, (a) pair(s) of breaker-side main circuit lead conductors provided on the circuit breaker and (a) pair(s) of base frame-side main circuit lead conductors provided on the base frame, wherein the breaker-side main circuit lead conductors are arranged to connect to the base frame-side main circuit lead conductors in the pushed-in position through a pair of contact fingers provided on the base frame, a safety shutter device which is provided on the base frame and including:

at least one lead conductor-carrying member provided on the base frame, leaving at least one insertion space between the lead conductor-carrying members or between the side wall of the base frame and one of the lead conductor-carrying members;

at least one fixed shutter blade provided on the front face of the lead conductor-carrying member and each having a pair of openings for permitting the breaker-side main circuit lead conductors to put therethrough; and at least one shutter driving unit accommodated in the insertion space and secured there by the fixed shutter blade, which includes; and a pair of movable shutter blades provided in front of the shutter driving unit, which are permitted of a limited vertical movement by the drawout and poushed-in operation of the circuit breaker and, when the shutter driving unit is accommodated in the insertion space, are located behind the fixed shutter blades to constitute a shutter-closed state for the switch gear in combination with the fixed shutter blades.

In the above-mentioned safety shutter device for drawout type switch gear, each of the shutter driving unit preferably comprises;

a rod which retracts into the shutter driving unit against the urging by a compressing spring, upon the push-in operation of the circuit breaker, and a pair of levers pivotally mounted on the shutter driving unit and engaging with the rod and the movable shutter blades, each of which rotates against the urging by a return spring, upon the retracting movement of the rod and causes one of the movable shutter blade to move, thereby causing the shutter device to open.

In the above-mentioned safety shutter device for drawout type switch gear, each of the shutter driving unit may alternatively comprises;

a pair of rod, each of which individually retracts into the shutter driving unit against the urging by a compression spring upon the push-in operation of the circuit breaker.

a pair of levers which are pivotally mounted on the shutter driving unit and engaging with one of the rods and one of the movable shutter blades, and each of which lever individually rotates against the urging by a return spring upon the retracting movement of the rod and causes one of the movable shutter blades to move, thereby causing the shutter device to partly open, and a pair of stoppers provided on each of the rods for retaining one of the rods in its retracted position.

The above-mentioned safety shutter device for drawout type switch gear may further comprises;

at least one lock plate having a width sufficient for holding the rod in its extended position, a pair of pawls for receiving the movable shutter blades and holding them not to move, a notch for accommodating the head of the rod, and an opening for a padlock, and the padlock which can engage with the opening for securing the lock plate in its fixed position on the rod.

As above-described, in accordance with the present invention, the installation of the safety shutter device can be completed simply by inserting the shutter driving unit into the insertion space, securing the unit therein with the fixed shutter blade, and fixing the movable shutter blades on the shutter driving unit. The thus configured safety shutter device has such an advantage that it can be installed without using any tool and that it has a good workability in assemblying as well as in its maintenance and inspection.

While the novel features of the present invention are set fourth particularly in the appended claims, the invention, both as to organization and content, will be better understood and appreciated, along with other objects and features thereof, from the following detailed description taken in conjunction with the attached drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

In the following paragraphs, the present invention will be described in more detail by way of example with reference to the preferred embodiments shown in the attached drawings.

EXAMPLE 1

Figure 1:
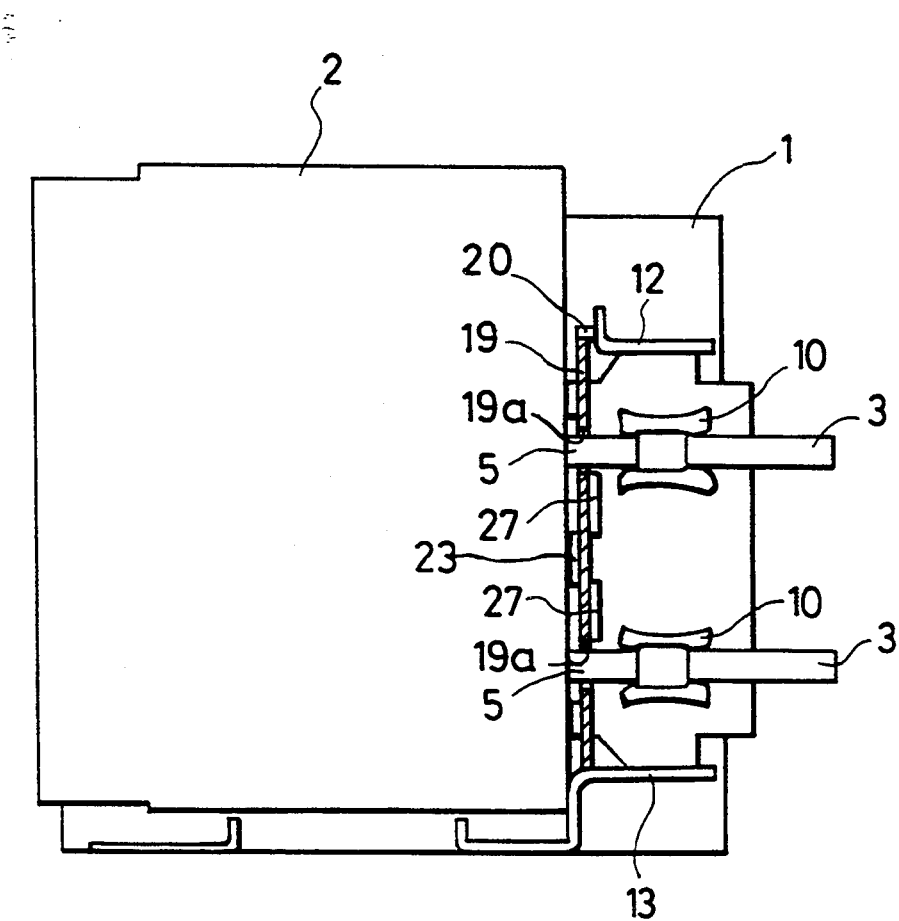
FIG. 1 is a schematic side view of the drawout type switch gear equipped with the safety device built in accordance with a first embodiment of the present invention, in its connected state.
Figure 2:
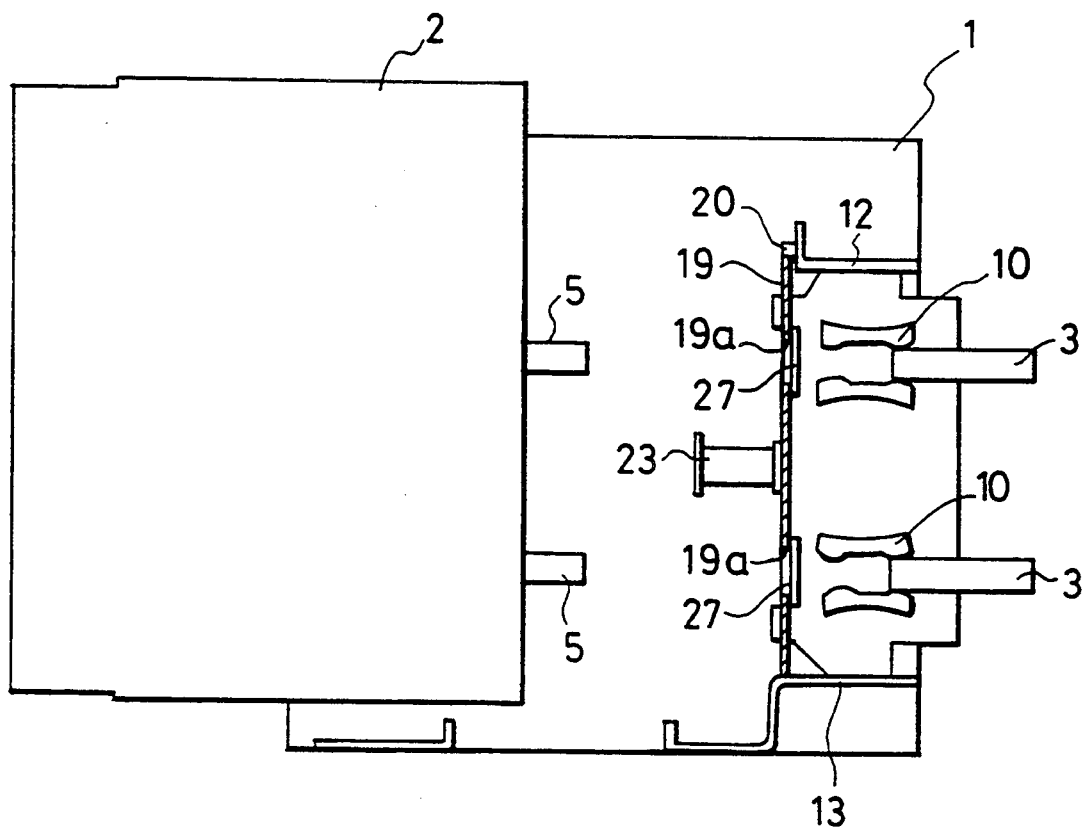
FIG. 2 is a schematic side view of the drawout switch gear of FIG. 1, in its disconnected state.
Figure 3:
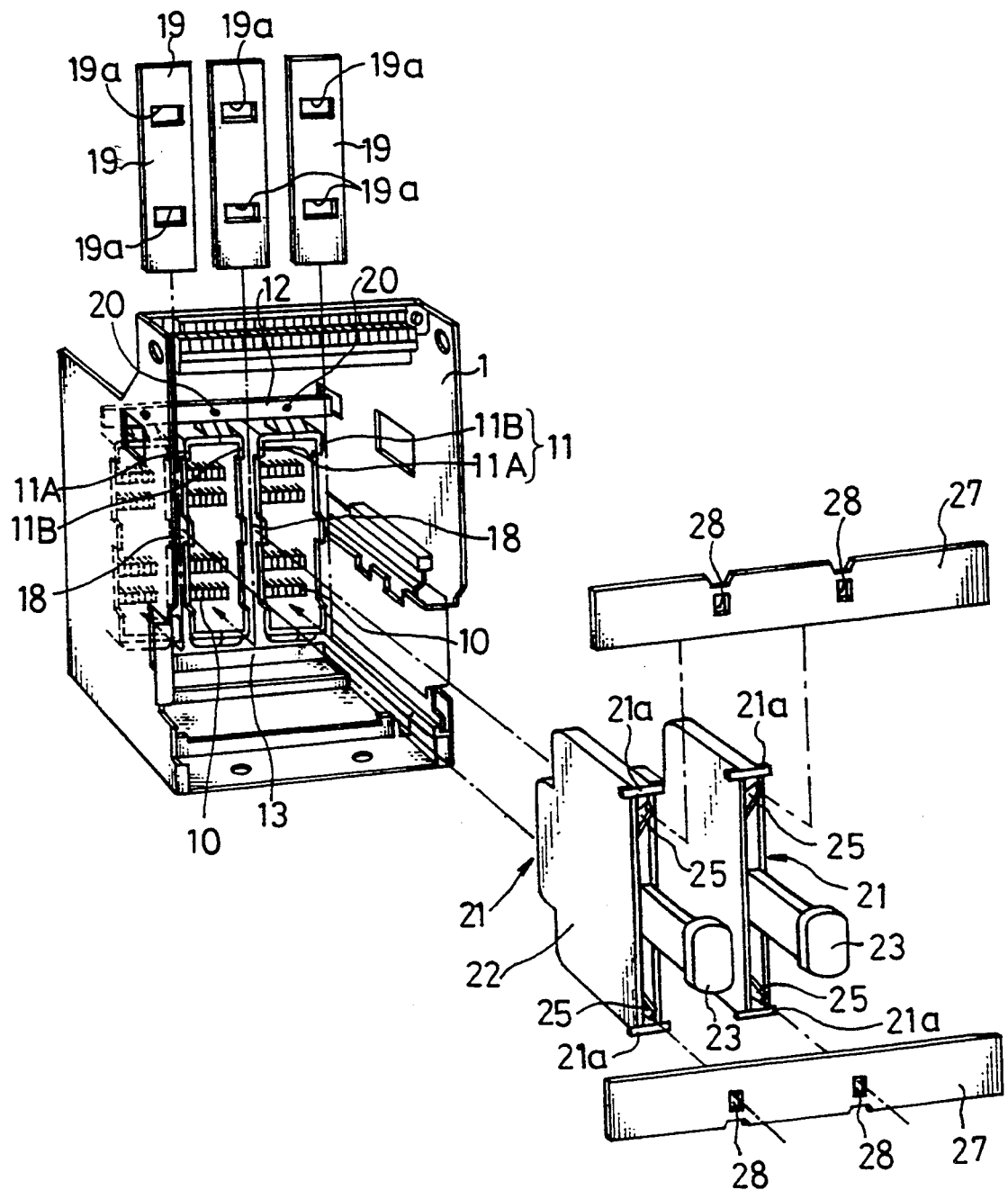
FIG. 3 is an exploded perspective view of a shutter device in the drawout type switch gear shown in FIGS. 1 and 2.
Figure 4:
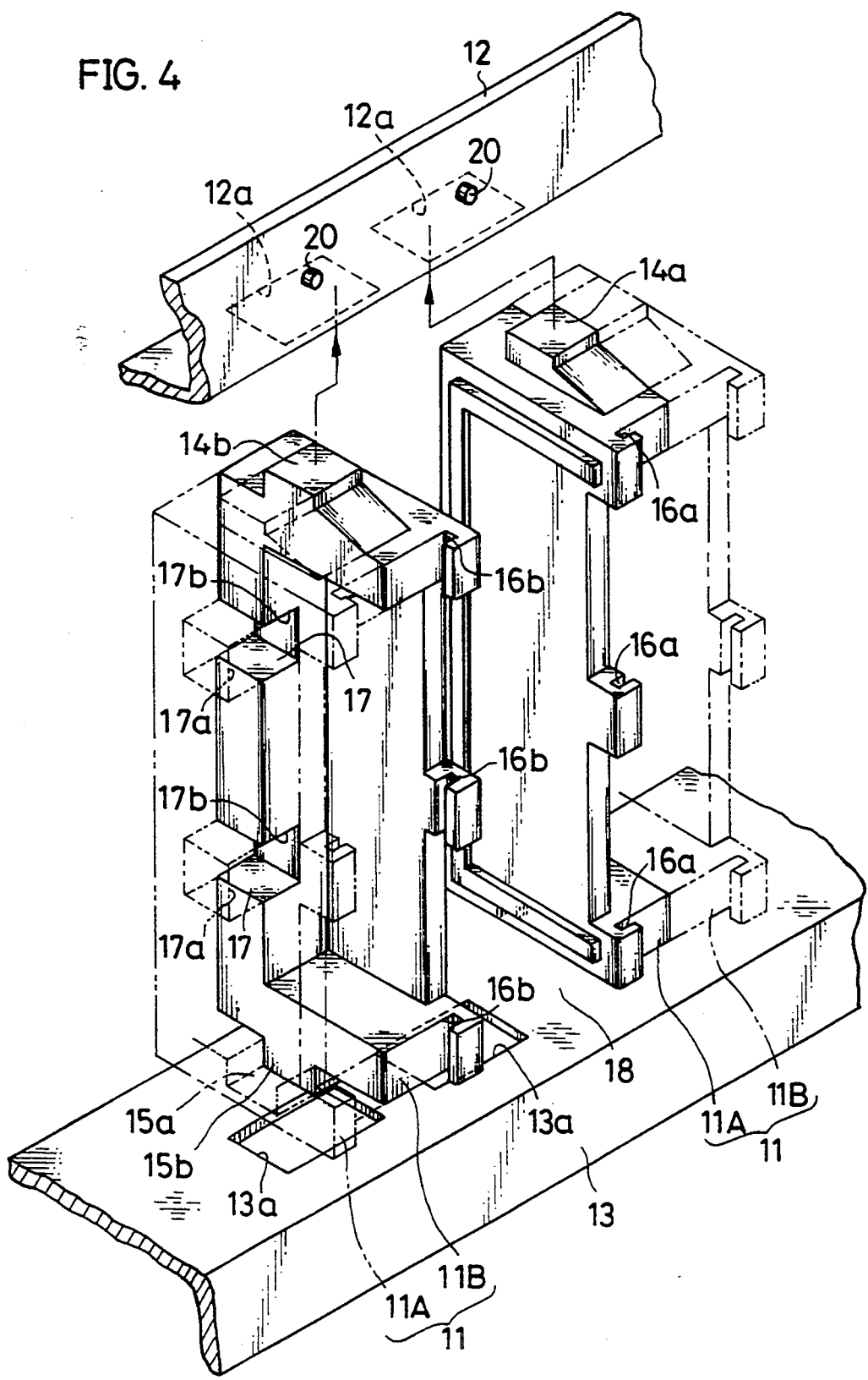
FIG. 4 is an exploded perspective view of lead conductor carrying parts in the drawout type switch gear shown in FIGS. 1 and 2.
Figure 5:
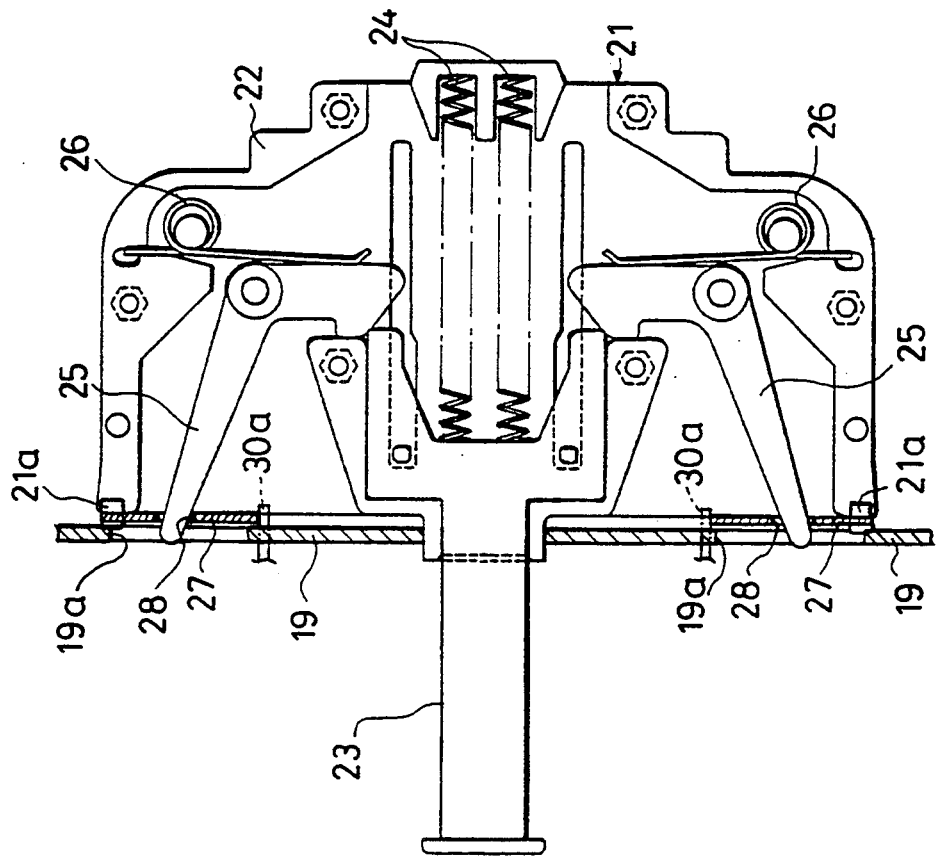
FIG. 5 is a schematic side view for illustrating a shutter driving unit in the drawout type switch gear shown in FIGS. 1 and 2, in its non-actuated state.
Figure 6:
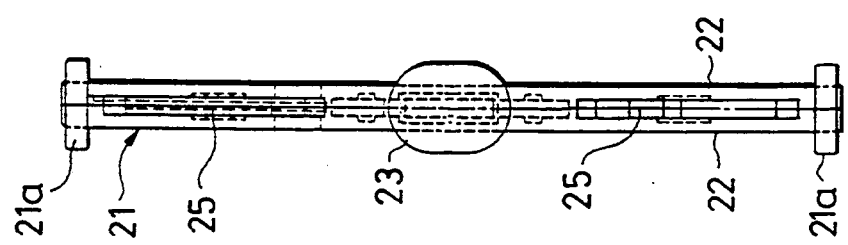
FIG. 6 is a rear view of the shutter driving unit shown in FIG. 5, as viewed the latter from the left side.
Figure 7:
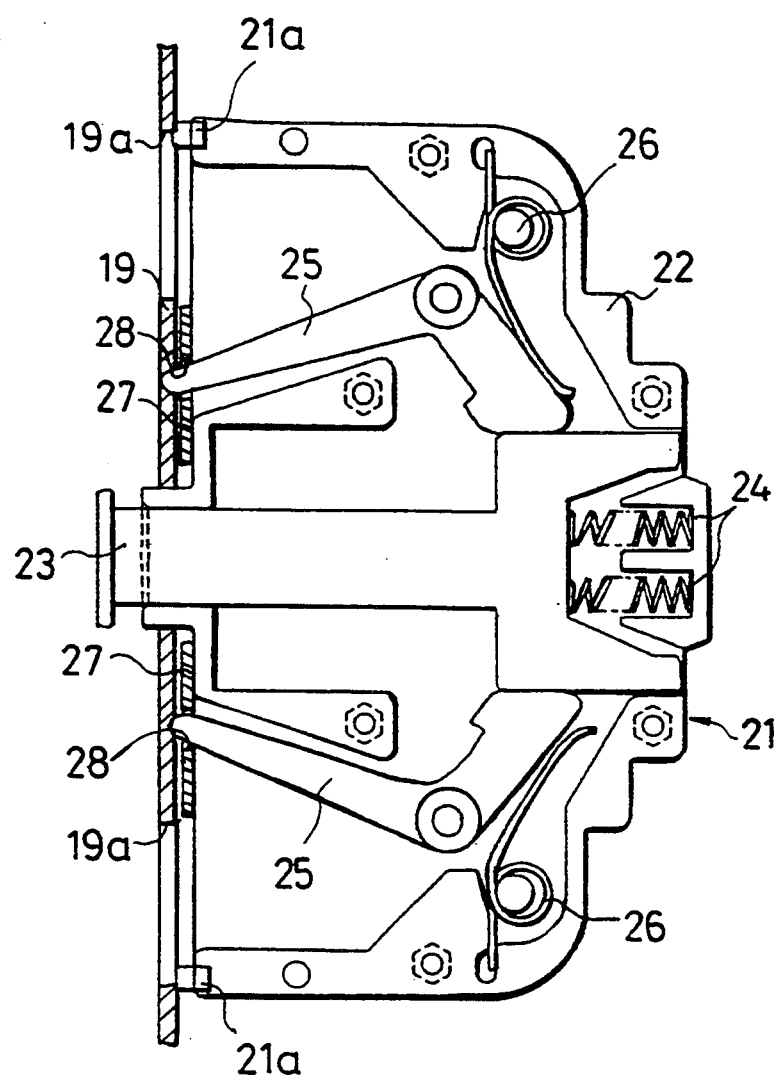
FIG. 7 is a schematic side view for illustrating the shutter driving unit of FIG. 5 in its actuated state.

The first embodiment of the present invention will now be illustrated by referring to FIG. 1 through FIG. 7 of the drawings. FIG. 1 is a schematic side view of the drawout type switch gear equipped with the safety device built in accordance with the first embodiment, in its connected state. FIG. 2 is a schematic side view of the drawout switch gear of FIG. 1, in its disconnected state. FIG. 3 is an exploded perspective view of a shutter unit in the drawout type switch gear shown in FIGS. 1 and 2. FIG. 4 is an exploded perspective view of lead conductor carrying parts in the drawout type switch gear shown in FIGS. 1 and 2. FIG. 5 is a schematic side view for illustrating a shutter driving unit in the drawout type switch gear shown in FIGS. 1 and 2, in its non-actuated state, FIG. 6 is a rear view of the shutter driving unit of in FIG. 5, as seen from the rear left side. FIG. 7 is a schematic side view for illustrating the shutter driving unit of FIG. 5 in its actuated state. In these Figures, the parts and components which are the same or equivalent to those used in the previously described prior art switch gear will be denoted with the same or similar reference numerals and the descriptions thereof will be omitted.

In these Figures, lead conductor-carrying members 11 are supported by an upper angle 12 and a lower angle 13 traversely provided on the base frame 1. Each of the lead conductor-carrying members 11 is composed of a pair of left-right (horizontally) symmetrical half bodies 11A and 11B (FIGS. 3 and 4). Each of the half bodies 11A and 11B had a dowel 14a or 14b for fitting in rectangular openings 12a provided on the upper angle 12, and dowel 15a or 15b for fitting in rectangular openings 13a provided on the lower angle 13. In addition, each of the half bodies 11A and 11B has on its front face three protrusions with guiding grooves 16a or 16b, and, on its rear face recesses 17a and 17b which, when combined together, each forms the openings 17 for passing the lead conductors therethrough.

When the lead conductor-carrying members 11 are supported by the upper and lower angles 12 and 13 in a state whereby the formers are getting in between the latters, there is formed insertion spaces 18 between each of the lead conductor-carrying members 11. Three fixed shutter blades 19 are having such sizes as to be inserted along the guiding grooves 16a and 16b downward and held on the front faces of the lead conductor-carrying members 11. Each of the fixed shutter blades 19 has two opening 19a for accommodating the lead conductors, and is prevented from its upward extracting movement by one of protrusions 20 provided on the upper angle 12. Each of the insertion spaces 18 permits the insertion of one of the shutter driving sub-units 21, and, in its accommodated state, is prevented from its forward extracting movement. This prevention is caused by engagement of the upper and lower lateral protrusions 21a of the shutter driving unit 21 with one of the inner face of the fixed shutter blades 19. Each of the shutter driving units 21 comprises a housing 22, a rod 23 which can project forward from the housing 22, a pair of compression springs 24 for giving an invariable projecting tendency on the rod 23, a pair of levers 25 each of which is shaped to be symmetrical with respect to the center line of the rod 23 and pivotally mounted on the housing 22, a pair of movable shutter blades 27 and a pair of return springs 26 for urging the levers 25 in the direction of closing the safety shutter device. Each of the movable shutter blades 27 is located between the front face of the lead conductor-carrying member 11 and one of the fixed shutter blades 19, and is vertically movable by one of the levers 25. Each of the levers 25 has an arm having a cam profile and engaging with the root part of the rod 23 and another arm engaging at its tip with one of the opening 28 provided on the movable shutter blade 27.

In the following paragraphs, the installation of the thus configured shutter unit in the drawout type switch gear will be described.

First, the lead conductor-carrying member 11 is fixed on the base frame 1 by combining each of the half bodies 11A and 11B together and fitting it in between the upper angle 12 having the rectangular openings 12a and the lower angle 13 having the rectangular openings 13a, as shown by FIG. 3. Then the insertion spaces 18 are formed between the lead conductor-carrying members 11. In the state shown in FIG. 3, when the shutter driving units 21 are inserted into these insertion spaces 18 and the fixed shutter blades 19 are inserted into the front face of the lead conductor-carrying members 11 between both guiding grooves 16a and 16b by pushing them 21 downward, the fixed shutter blades 19 are retained there by the protrusions 20 as shown by FIGS. 1 and 2. In this state, the lateral protrusions 21a of the shutter driving units 21 are engaging with the inner faces of the fixed shutter blades 19 and prevent the shutter driving units 21 from their forward extracting movement. Thus the shutter driving units 21 are retained there, as shown by FIGS. 5 and 7. Before the fixed shutter blades 19 are inserted downward, the tips of the levers 25 have previously been fit in the openings 28 of the movable shutter blades 27 located behind the fixed shutter blades 19.

As previously described, the safety shutter device of the present invention can be installed in the switch gear without any need of tools. In the assembled state, when the circuit breaker 2 is in its drawout position, the movable shutter blades 27 are in their closed position because the rods 23 are projected and the levers 25 are urged by the return springs 26 to close the movable shutter blades 27 as shown by FIGS. 2 and 5. On the other hand, when the circuit breaker 2 is moved to its connected position and pushes the projected rods 23, the levers 25 are rotated against the urging by the return springs 26 thereby to open the movable shutter blades 27 and bring the connected state of the circuit breaker 2 as shown by FIGS. 1 and 7.

EXAMPLE 2

Figure 8:
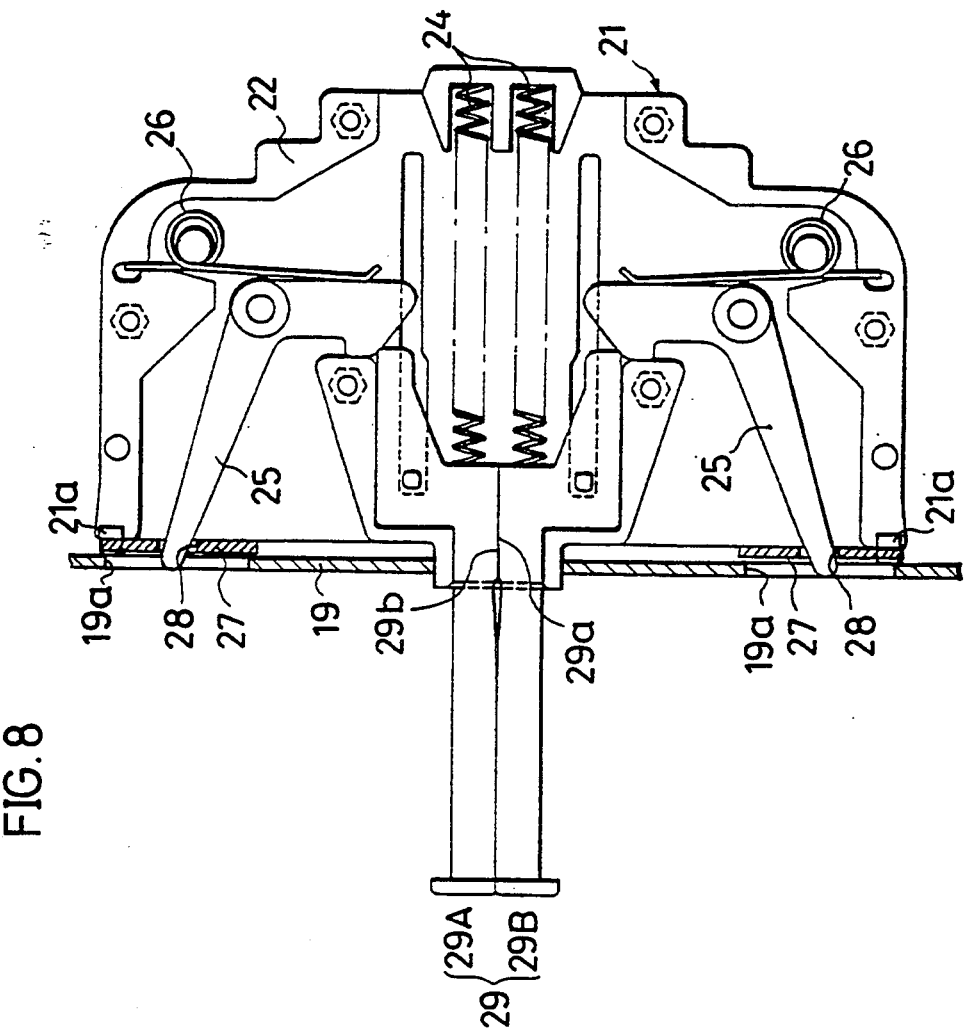
FIG. 8 is a schematic side view for illustrating the shutter driving unit built in accordance with a second embodiment of the present invention
Figure 9:
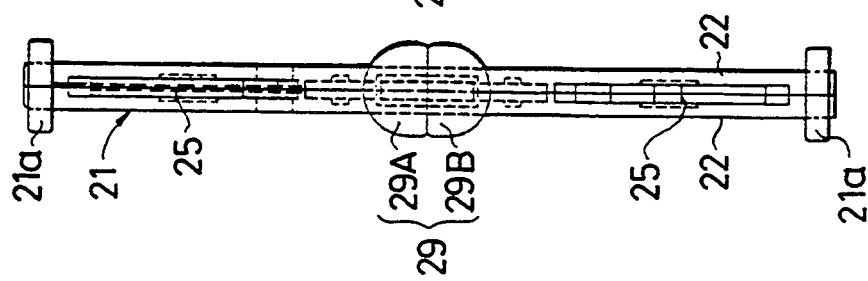
FIG. 9 is a rear view the shutter driving unit shown in FIG. 8, as viewed the latter from the left side.
Figure 10:
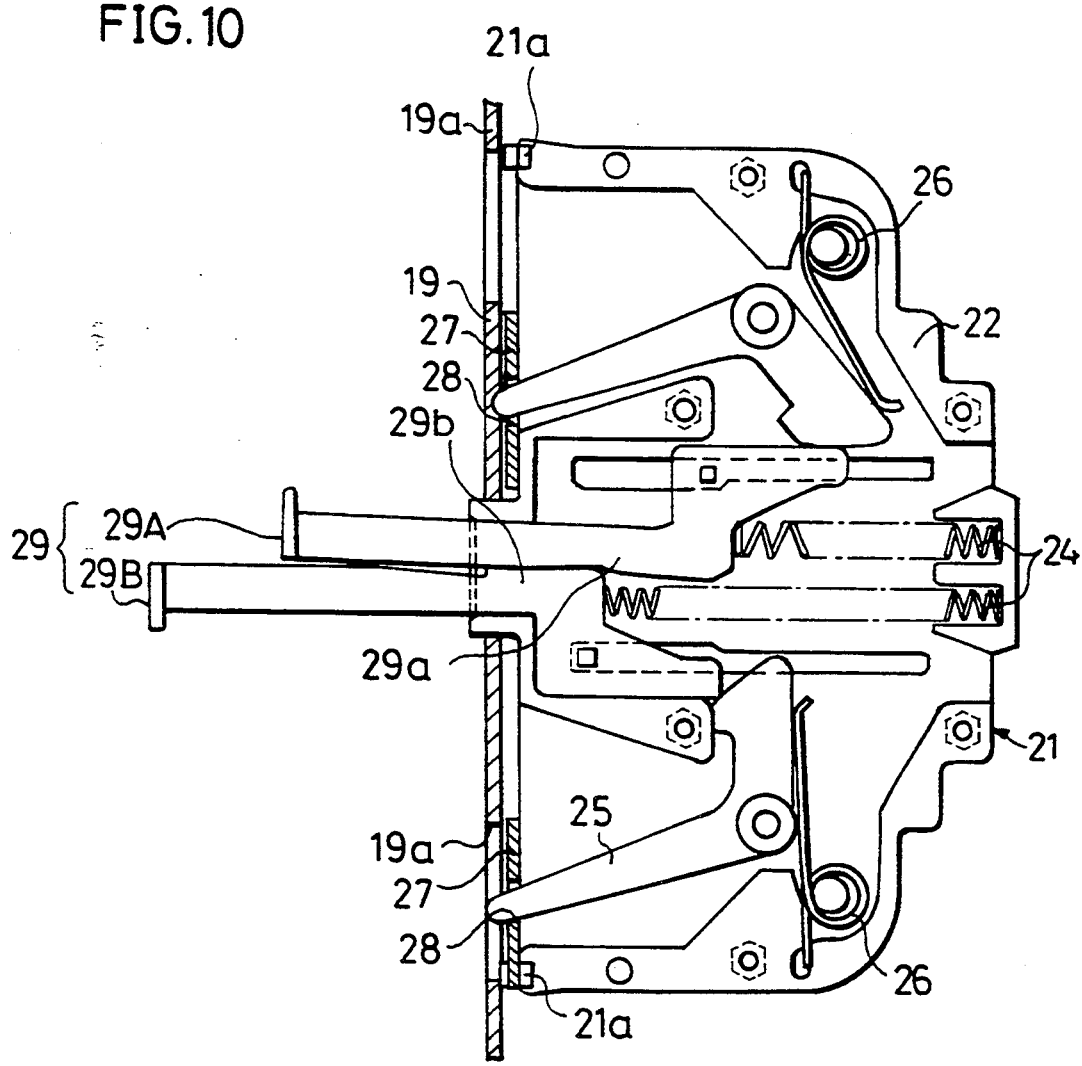
FIG. 10 is a schematic side view for illustrating the shutter driving unit of FIG. 8 in its actuated state.
Figure 11:
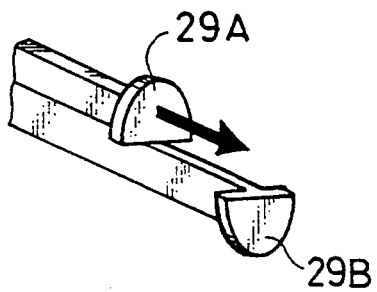
FIG. 11 is a schematic perspective view of the rods in the shutter driving unit shown in FIG. 8.
Figure 12:
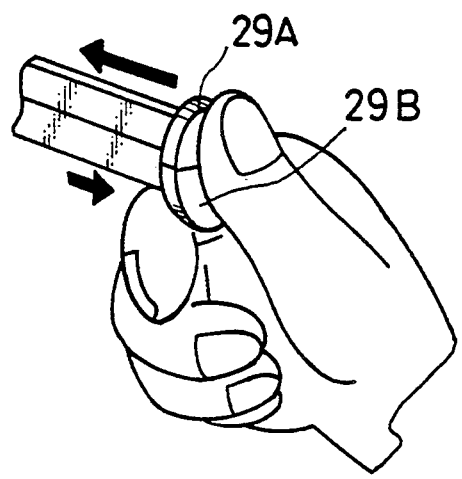
FIG. 12 is a schematic perspective view of the rods in the shutter driving unit of FIG. 8 with a man's hand, for illustrating the manner of actuating the rods.

Another embodiment of the present invention will be described with reference to FIG. 8 through FIG. 12 of the drawings. FIG. 8 is a a schematic side view for illustrating the shutter driving unit. FIG. 9 is a rear view the shutter driving unit shown in FIG. 8, as viewed the latter from the left side. FIG. 10 is a schematic side view for illustrating the shutter driving unit of FIG. 8 in its actuated state. FIG. 11 is a schematic perspective view of the rods in the shutter driving unit shown in FIG. 8. And FIG. 12 is a schematic perspective view of the rods in the shutter driving sub-unit of FIG. 8 with a man's hand, for illustrating the manner of actuating the rods. In these Figures, the parts and components which are the same or equivalent to those used in the foregoing embodiment will be denoted with the same or similar reference numerals, and the descriptions therefor will be omitted.

In this embodiment, a rod 29 for the shutter driving unit 21 is composed of a pair of vertically symmetrical upper half rod 29A and lower half rod 29B, each of which has a stopper 29a or 29b on its confronting face. One of the stoppers 29a or 29b can engage with one of the root portion of the pair of half rods 29B or 29A as shown by FIG. 10.

When the rod 29 is configured to be divided into the pair of half rod 29A and 29B, only one of the movable shutter blades, for instance, the upper shutter blade 27 can be opened by pushing in only the upper half rod 29A. An inspection on one of the circuits of the source side and the load side, namely, the inspection on a circuit actually requiring a check, can be performed individually by opening only one of the movable shutter 27, and thereby the safety is further improved. Since, the stopper 29a is engaging with the half rod 29B as shown by FIG. 10 when the half rod 29A is pushed, the upper half rod 29A is retained at the pushed-in state, and the upper movable shutter blade 27 is held at its opened position. The upper half rod 29A can be released from the engagement with the lower half rod 29B by pulling it from the shutter driving subunit 11 in the direction indicated by an arrow shown in FIG. 11. The rod 29 as the whole can be integrally pushed in or pulled from the shutter driving unit 11 as a combined body of the half rods 29A and 29B together or individually.

EXAMPLE 3

Figure 13:
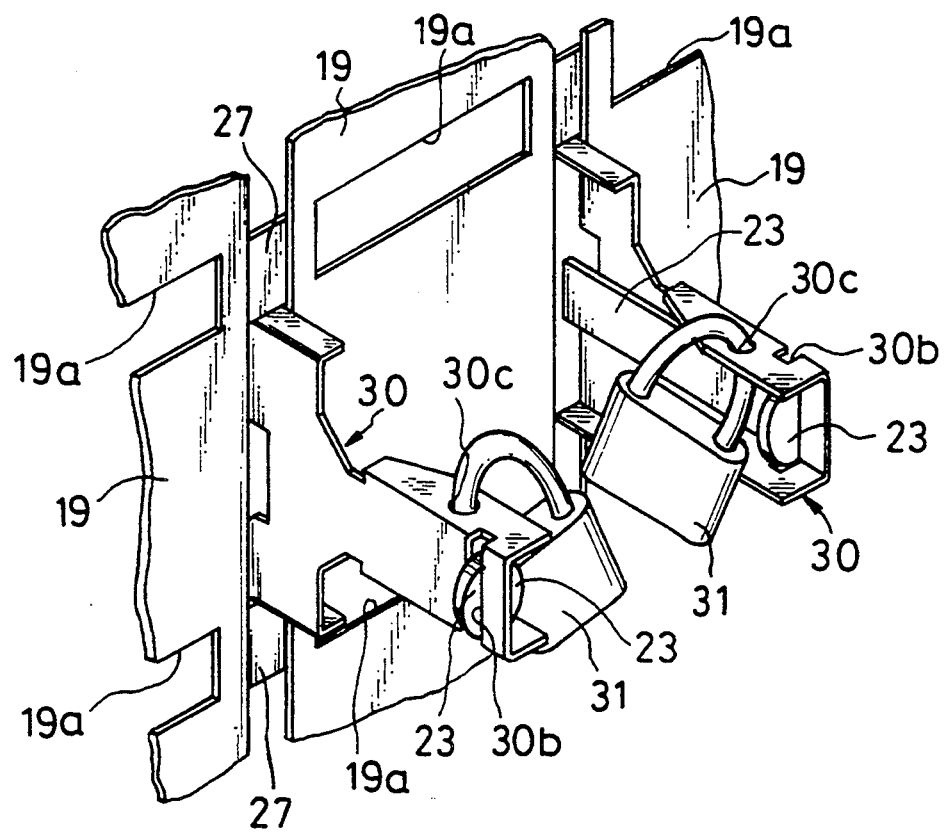
FIG. 13 is a perspective view of the safety shutter device built in accordance with a third embodiment of the present invention, in its locked state.
Figure 14:
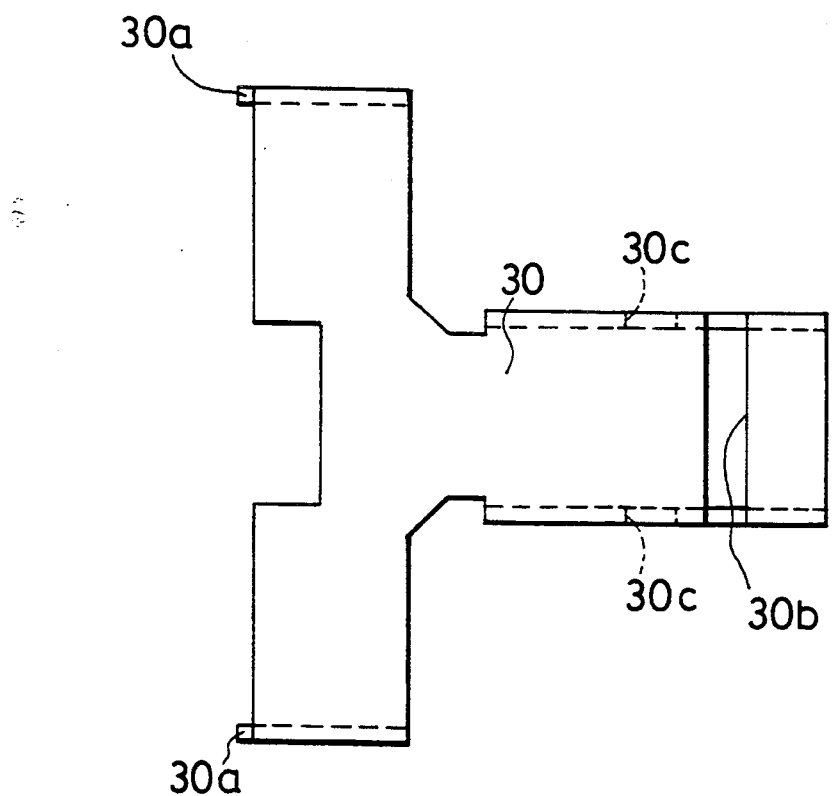
FIG. 14 is a schematic side view of a lock plate for use in the safety device shown in FIG. 13.
Figure 15:
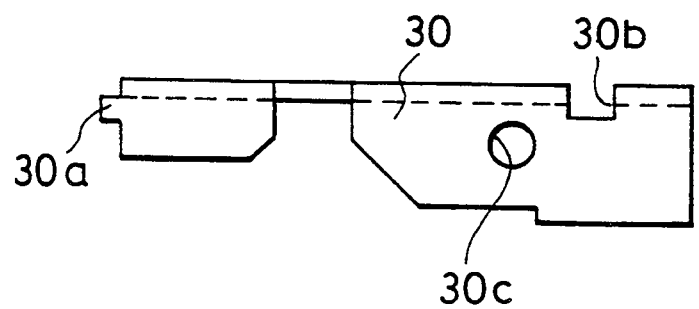
FIG. 15 is a schematic plan view of the lock plate shown in FIG. 14.
Figure 16:
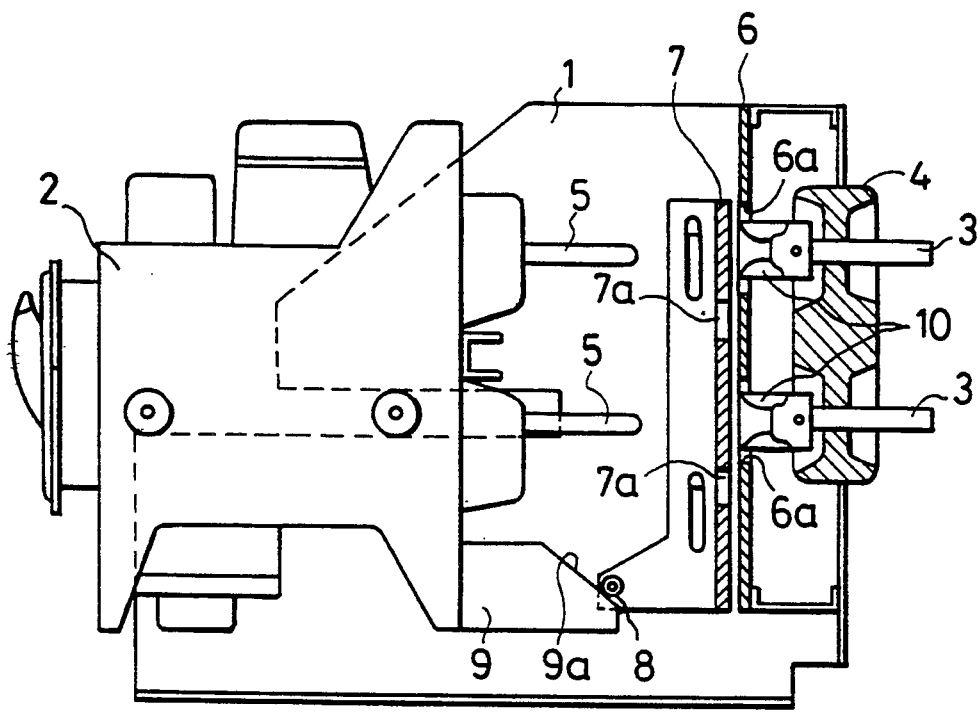
FIG. 16 is a schematic side view of the prior art drawout type switch gear in its state wherein the circuit breaker is withdrawn from the base frame.
Figure 17:
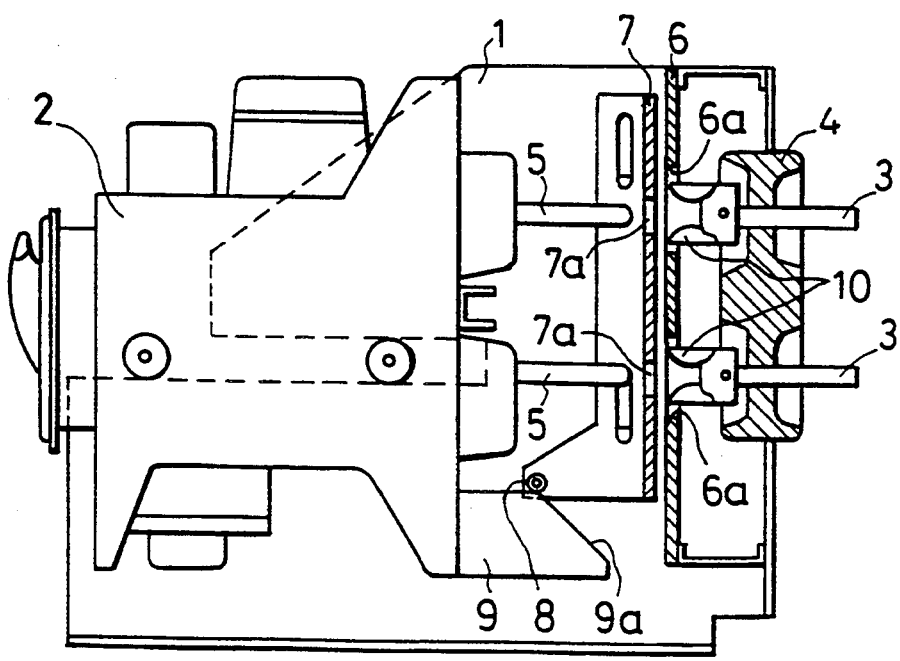
FIG. 17 is a schematic side view of the prior art drawout type switch gear shown in FIG. 16, in its state wherein the circuit breaker is in its way to be inserted into the base frame.
Figure 18:
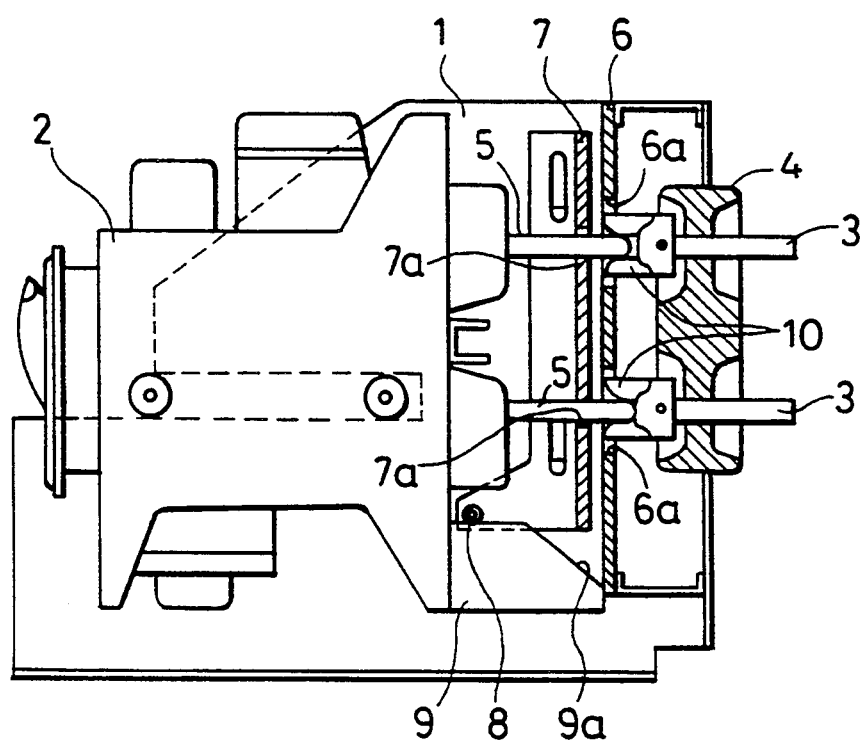
FIG. 18 is a schematic side view of the prior art drawout type switch gear shown in FIGS. 16 and 17, in its connected state.

A further embodiment of the present invention will now be described with reference to FIG. 13 through FIG. 15 of the drawings. FIG. 13 is a perspective view of the safety shutter device of this embodiment, in its locked state. FIG. 14 is a schematic side view of a lock plate for use in the safety device shown in FIG. 13. FIG. 15 is a schematic plan view of the lock plate shown in FIG. 14. In these Figures, the parts and components which are the same or equivalent to those used in the forgoing embodiment will be denoted with the same or similar reference numerals and the descriptions therefor will be omitted.

As shown by FIGS. 14 and 15, each of the lock plates 30 has a pair of pawls 30a for receiving and retaining the movable shutter blades 27 in their closed positions, a notch 30b for accommodating the head part of the rod 23 or 29, and an opening 30c for receiving a padlock 31.

In the drawout state of the circuit breaker 2 as shown by FIG. 2, when the pawls 30a of the lock plate 30 of a flexible metal plate are inserted in the front face of the shutter driving sub-unit 11 beyond the location of the movable shutter blades 27 (the location is indicated by the dotted line in FIG. 5). Then, the head of the rod 23 is fit in the notch 30b by means of the flexibility of the lock plate 30, and the padlock 31 is fixed through the opening 30c for fixing the lock plate 30 to the rod 23 as shown by FIG. 13. Accordingly the pushing-in operation of the rod 23 and the insertion of the circuit breaker 2 are effectively prevented. Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A drawout type switch gear comprising:
   a base frame,
   a circuit breaker which is movably mounted on said base frame in a manner to be drawn out of or pushed into said base frame when transferred between a drawout position and a pushed-in position,
   at least a pair of breaker-side main circuit lead conductors provided on said circuit breaker and corresponding pair of base frame-side main circuit lead conductors provided on said base frame, said breaker-side main circuit lead conductors being arranged to connect to said base frame-side main circuit lead conductors in said pushed-in position through a pair of contact fingers provided on said base frame, and
   a safety shutter device which is provided on said base frame and including:
   at least one lead conductor-carrying member provided on said base frame, leaving at least one insertion space between said lead conductor-carrying members or between the side wall of said base frame and one of said lead conductor-carrying members,
   at least one fixed shutter blade provided on the front face of said lead conductor-carrying member and each having a pair of openings for permitting said breaker-side main circuit lead conductors to pass therethrough, and
   at least one shutter driving unit accommodated in said insertion space and secured there by said fixed shutter blade, each of which includes, and
   a pair of movable shutter blades provided in front of said shutter driving unit, which are capable of a limited vertical movement by said drawout and pushed-in operation of said circuit breaker and, when said shutter driving unit is accommodated in said insertion space, are located behind said fixed shutter blades to constitute a shutter-closed state for the switch gear in combination with said fixed shutter blades.

2. The safety shutter device for drawout type switch gear in accordance with claim 1, wherein each of said shutter driving units comprising:
   a rod which retracts into said shutter driving unit against the urging by a compression spring, upon said push-in operation of said circuit breaker, and
   a pair of levers pivotally mounted on said shutter driving unit and engaging with said rod and said movable shutter blades, each of which rotates against the urging by a return spring, upon said retracting movement of said rod and causes one of the movable shutter blades to move, thereby causing the shutter device to open.

3. The safety shutter device for drawout type switch gear in accordance with claim 1, wherein each of said shutter driving units comprising:
   a pair of rods, each of which individually retracts into said shutter driving unit against the urging by a compression spring upon said push-in operation of said circuit breaker,
   a pair of levers which are pivotally mounted on the shutter driving unit and engaging with one of said rods and one of said movable shutter blades, and each of which lever individually rotates against the urging by a return spring upon said retracting movement of said rod and causes one of the movable shutter blades to move, thereby causing the shutter device to partly open, and
   a pair of stoppers provided on each of said rods for retaining one of the rods in its retracted position.

4. The safety shutter device for drawout type switch gear in accordance with claim 2 or 3, further comprising:
   at least one lock plate having a width sufficient for holding said rod in its extended position, a pair of pawls for receiving said movable shutter blades and holding them not to move, a notch for accommodating the head of said rod, and an opening for a padlock, and
   the padlock which can engage with said opening for securing said lock plate in its fixed position on said rod.

* * * * *